(12) United States Patent
Tokunaga

(10) Patent No.: US 10,897,054 B2
(45) Date of Patent: Jan. 19, 2021

(54) FUEL CELL UNIT

(71) Applicant: TOYOTA JIDOSHA KABUSHIKI KAISHA, Toyota (JP)

(72) Inventor: Takuo Tokunaga, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 100 days.

(21) Appl. No.: 15/902,424

(22) Filed: Feb. 22, 2018

(65) Prior Publication Data
US 2018/0277870 A1 Sep. 27, 2018

(30) Foreign Application Priority Data
Mar. 27, 2017 (JP) .................. 2017-061864

(51) Int. Cl.
*H01M 8/04701* (2016.01)
*H01M 8/04955* (2016.01)
*H01M 8/04029* (2016.01)
*B60L 50/72* (2019.01)
*B60L 58/33* (2019.01)
*H01M 8/1018* (2016.01)

(52) U.S. Cl.
CPC ......... *H01M 8/04738* (2013.01); *B60L 50/72* (2019.02); *B60L 58/33* (2019.02); (Continued)

(58) Field of Classification Search
CPC ......... H01M 8/04738; H01M 8/04029; H01M 8/04955; H01M 2008/1095; (Continued)

(56) References Cited

U.S. PATENT DOCUMENTS 6,443,253 B1* 9/2002 Whitehead ............... B60K 1/04 165/127
8,673,467 B2* 3/2014 Katano ................... B60K 1/04 429/7
(Continued)

FOREIGN PATENT DOCUMENTS

JP 2006117096 A 5/2006
JP 2010272462 A 12/2010
(Continued)

*Primary Examiner* — Michael L Dignan
(74) *Attorney, Agent, or Firm* — Dickinson Wright PLLC

(57) ABSTRACT

A fuel cell unit including a fuel cell stack, boost converter, and relay for switching on and off electric power output from the fuel cell stack housed in one case, and capable of avoiding damage from excessive heat generation of the relay as well as suppressing an excessive increase in the ambient temperature inside the case. In the fuel cell unit, a first cooling pipe that delivers refrigerant for cooling to a switching element that forms the boost converter and is provided in an electric power converter IPM and a second cooling pipe that delivers the refrigerant after cooling are provided inside the case. The relay for switching on and off the electric power output from the fuel cell stack is disposed closer to the cooling pipes than to the switching element in the electric power converter IPM. Heat generation of the relay is suppressed by the refrigerant flowing through the cooling pipes and also the relay is not significantly affected by the heat generation of the switching element.

4 Claims, 4 Drawing Sheets

(52) U.S. Cl.
CPC ... *H01M 8/04029* (2013.01); *H01M 8/04955* (2013.01); *H01M 2008/1095* (2013.01); *H01M 2250/20* (2013.01); *Y02T 10/70* (2013.01); *Y02T 90/40* (2013.01)

(58) Field of Classification Search
CPC .... H01M 2250/20; B60L 50/72; B60L 58/33; Y02T 90/32; Y02T 10/7005
See application file for complete search history.

(56) References Cited

U.S. PATENT DOCUMENTS

| | | | |
|---|---|---|---|
| 2006/0240297 A1* | 10/2006 | Takeda | H01M 8/04007 429/431 |
| 2008/0130223 A1* | 6/2008 | Nakamura | H02M 7/003 361/689 |
| 2010/0025126 A1* | 2/2010 | Nakatsu | B60L 11/00 180/65.1 |
| 2013/0045398 A1 | 2/2013 | Katano et al. | |
| 2014/0126154 A1* | 5/2014 | Higuchi | B60L 15/20 361/714 |
| 2015/0197165 A1* | 7/2015 | Katano | B60K 1/00 429/428 |
| 2016/0064756 A1* | 3/2016 | Yuzuriha | B01J 47/14 429/410 |

FOREIGN PATENT DOCUMENTS

| | | |
|---|---|---|
| JP | 2011-162108 A | 8/2011 |
| JP | 2011234587 A | 11/2011 |
| JP | 2013-247083 A | 12/2013 |
| WO | 2012150629 A1 | 11/2012 |

\* cited by examiner

FUEL CELL UNIT

CROSS REFERENCE TO RELATED APPLICATIONS

The present application claims priority from Japanese patent application JP 2017-061864 filed on Mar. 27, 2017, the content of which is hereby incorporated by reference into this application.

BACKGROUND

Technical Field

The present disclosure relates to a fuel cell unit that includes a fuel cell stack and a boost converter.

Background Art

There has been known a fuel cell unit that includes a fuel cell stack formed by stacking a plurality of fuel cells, a boost converter configured to boost the electric power output from the fuel cell stack, and components such as a relay for switching on and off the electric power output from the fuel cell stack. A fuel cell vehicle provided with such a fuel cell unit is described in, for example, JP 2013-247083 A.

In the fuel cell unit described in JP 2013-247083 A, the fuel cell stack is housed in one fuel cell case and the boost converter in a separate boost converter case, and the two cases are detachably electrically connected to each other. In the fuel cell case, the relay for switching on and off the electric power output from the fuel cell stack and the like are also housed, and cooling water for cooling the relay and the like circulates within the fuel cell case. Meanwhile, in the boost converter case, a plurality of reactors (coils), a switching element, and the like that form the boost converter are housed. Further, the fuel cell stack and the boost converter are disposed below a floor panel of the fuel cell vehicle.

A fuel cell vehicle is also suggested that has the fuel cell unit together with auxiliaries entirely disposed inside an engine compartment, not below a floor panel of the vehicle, and an example of such a fuel cell vehicle is described in JP 2011-162108 A.

SUMMARY

In the fuel cell unit, heat is generated from the fuel cell stack, boost converter, and the like during the operation. As described in JP 2013-247083 A, in the fuel cell unit with the fuel cell stack and the boost converter that are housed in the fuel cell case and the boost converter case, respectively, which are disposed below the floor panel of the vehicle, the heat generation of the boost converter does not affect much the relay and the like, and thus no particular problem is caused by the heat generation.

Meanwhile, regarding the fuel cell vehicle such as the one described in JP 2011-162108 A that has the fuel cell unit together with auxiliaries entirely disposed inside the engine compartment, the inventors have continued many experiments and studies on the improvement in the performance, and have newly found the following problems during the experiments and studies.

Specifically, the problems found are: (a) when the fuel cell unit together with auxiliaries are entirely disposed inside the engine compartment, it is preferable to house the fuel cell stack, boost converter, relay for switching on and off the electric power output from the fuel cell stack, and the like in one case, considering the space, but with such components all together housed in one case, the ambient temperature inside the case may excessively increase; and (b) when a large current relay for switching on and off the electric power output from the fuel cell stack is disposed inside the case, the temperature of the relay significantly increases due to an increase in the ambient temperature inside the case in addition to self-generated heat of the relay, and in some cases, the temperature of the relay may increase to near an allowable temperature.

The present disclosure has been made in view of the aforementioned circumstances, and provides a fuel cell unit capable of solving the aforementioned problems newly found by the inventors during the demonstration experiments.

A fuel cell unit according to the present disclosure includes a fuel cell stack, a boost converter that has at least a switching element and a reactor adapted to boost the electric power output from the fuel cell stack, a cooling component that has a channel for refrigerant for cooling the switching element, a cooling pipe that has a first cooling pipe through which refrigerant to flow into the channel for refrigerant of the cooling component flows and a second cooling pipe through which the refrigerant flowing out of the channel for refrigerant flows, and a relay for switching on and off the electric power output from the fuel cell stack, and the fuel cell stack, boost converter, cooling pipe, and relay are housed in one case, and the relay is disposed in a position closer to the cooling pipe than to the switching element.

This fuel cell unit includes the cooling pipe through which refrigerant flows, the refrigerant being used for cooling the switching element that generates a large amount of heat among the components of the boost converter. Further, the relay is disposed in a position closer to the cooling pipe than to the switching element. The ambient temperature in a position near the cooling pipe is made lower than that near the switching element, as the refrigerant flows through the cooling pipe. Thus, an excessive increase in the temperature of the relay is suppressed, thereby enabling the relay to stably operate and have a long life. Furthermore, refrigerant is passed through the cooling pipe for the cooling component for cooling the switching element that generates a particularly large amount of heat, so that the heat generation of the entire boost converter can also be suppressed. This ensures the stable operation of the boost converter and can also suppress an increase in the temperature inside the case.

In one aspect of the fuel cell unit according to the present disclosure, the relay is disposed in a position between the first cooling pipe and the second cooling pipe.

In this aspect, with the relay disposed between the two cooling pipes that are the first cooling pipe and the second cooling pipe, the cooling effect of the refrigerant on the relay is enhanced, thereby enabling an increase in the temperature of the relay to be surely suppressed.

In the fuel cell unit of such an aspect, it is preferable to dispose the relay in a position closer to the second cooling pipe than to the first cooling pipe.

The reason is that since the relay to be cooled is disposed closer to the second cooling pipe, the refrigerant flowing through the cooling pipe loses its cooled heat due to the cooling of the relay more in the second cooling pipe than in the first cooling pipe That is, the refrigerant flowing through the first cooling pipe can reach the cooling component without a substantial loss of the cooled heat, and therefore, the primary function of the refrigerant to cool the boost converter can be almost surely prevented from being lost due to the cooling of the relay.

In one aspect of the fuel cell unit according to the present disclosure, the fuel cell unit includes one or more bus bars that electrically connect the relay to another component in the case, and the one or more bus bars are at least partially disposed along the cooling pipe.

In this aspect, since an increase in the temperature of the one or more bus bars is suppressed by the cooled heat of the refrigerant that flows through the cooling pipe, the increase in the temperature of the relay can be further suppressed.

In one aspect of the fuel cell unit according to the present disclosure, the one or more bus bars have a cross-sectional area exceeding a cross-sectional area that can tolerate the maximum current flowing therethrough.

In this aspect, the cross-sectional area of the one or more bus bars is set larger than that originally required, so that the heat radiation performance of the one or more bus bar can be enhanced, and as a result, an increase in the temperature of the relay can be suppressed.

According to the present disclosure, in the fuel cell unit in which the fuel cell stack, the boost converter adapted to boost the electric power output from the fuel cell stack, the relay for switching on and off the electric power output from the fuel cell stack, and the like, which are necessary for operating a fuel cell vehicle or the like, are housed in one case, an excessive increase in the ambient temperature inside the case can be suppressed and damage caused by the excessive heat generation of the relay can also be surely avoided, thereby enabling the fuel cell unit to stably operate and have a long life.

BRIEF DESCRIPTION OF THE DRAWINGS

FIG. 3 is a view of an electric circuit for illustration of operation of a boost converter and the like.

DETAILED DESCRIPTION

An embodiment of the present disclosure will be described below with reference to the drawings.

Figure 1:
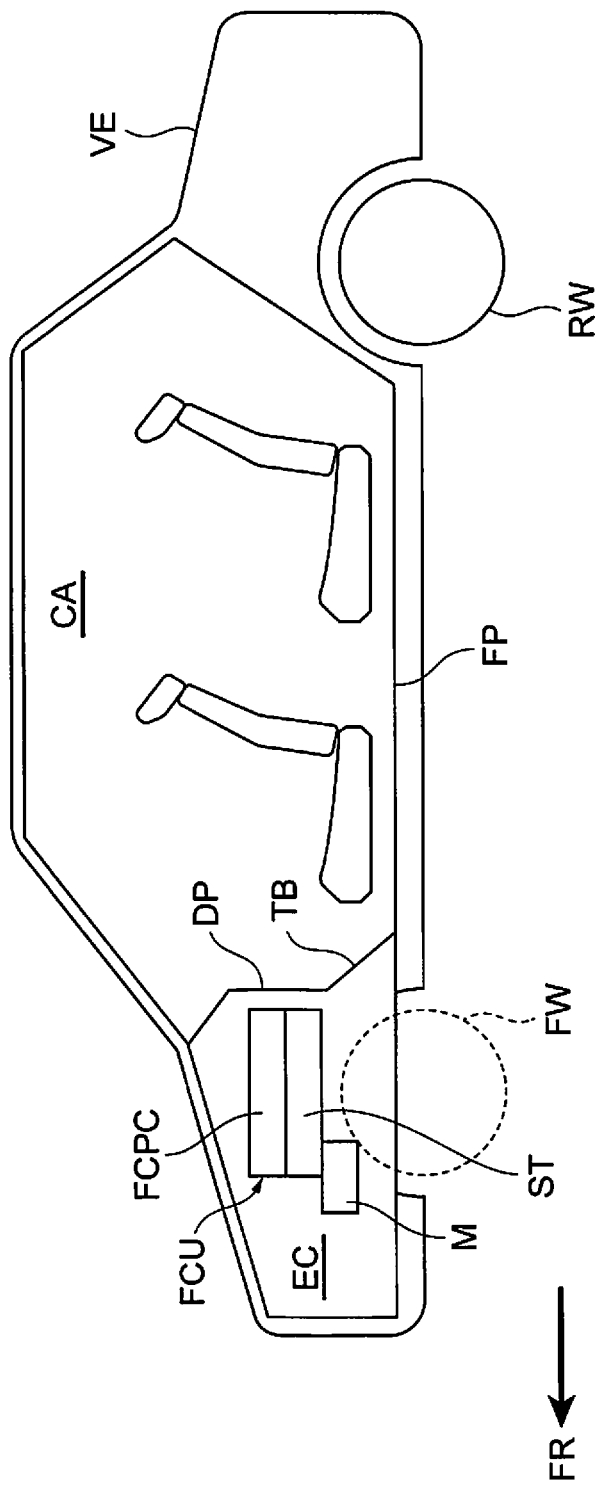
FIG. 1 is a schematic view of an example of a fuel cell vehicle with a fuel cell unit according to the present disclosure mounted thereon.

FIG. 1 is a schematic view of an example of a vehicle VE with a fuel cell unit FCU mounted thereon. The vehicle VE has a drive motor M driven by the electric power generated by the fuel cells, and the torque of the drive motor M is transmitted to front wheels FW and/or rear wheels RW to run the vehicle VE. The vehicle VE has a cabin CA and an engine compartment EC, and they are partitioned with a dash panel DP and a toe board TB. The fuel cell unit FCU includes a fuel cell stack ST that forms the fuel cells and a fuel cell power control unit FCPC (hereinafter simply referred to as the FCPC) that includes a boost converter, and as shown in FIG. 1, the fuel cell stack ST and the FCPC are integrally assembled such that the FCPC is placed on the fuel cell stack ST when they are mounted on the vehicle VE. The vehicle VE also has a storage battery (not shown in FIG. 1) for storing the electric power generated by the fuel cells. FP in FIG. 1 represents a floor panel.

In the fuel cell stack ST, a plurality of polymer electrolyte fuel cells each having a membrane electrode assembly (MEA), for example, are stacked in layers, and an electromotive force can be obtained through an electrical chemical reaction of pure hydrogen as a fuel gas and oxygen in the air as an oxidant gas in each of the cells.

Figure 2:
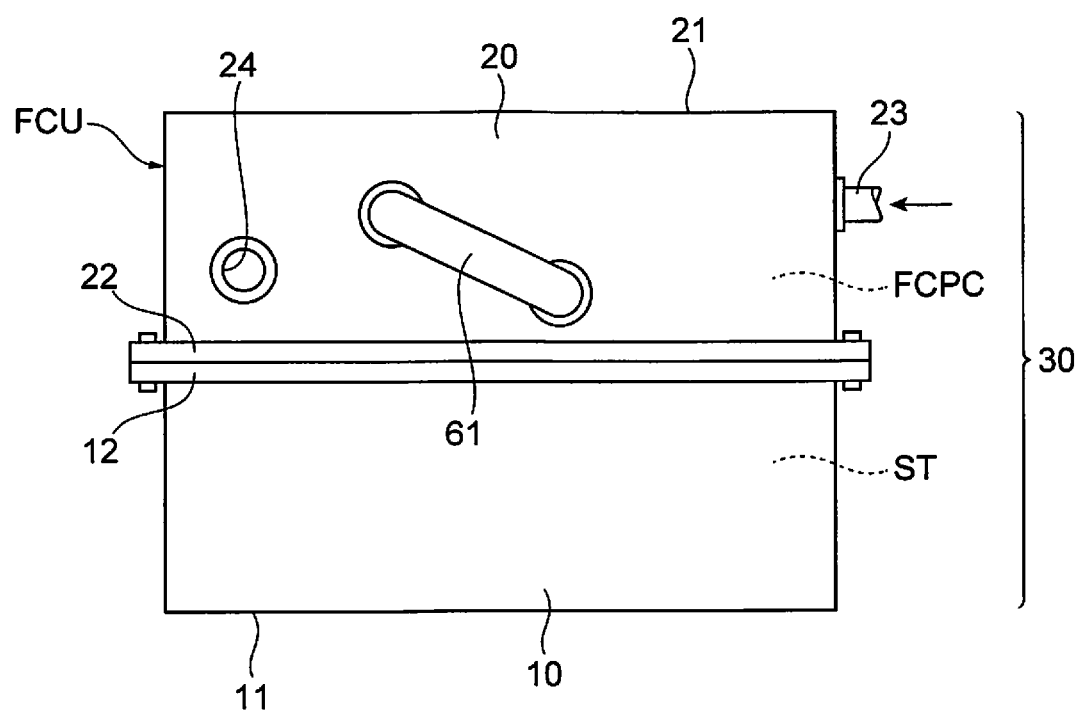
FIG. 2 is a schematic view of a side surface of the fuel cell unit.

FIG. 2 is a side view showing the outer appearance of the fuel cell unit FCU. The fuel cell stack ST is housed in a lower case 10 with a bottom 11 and an open upper side. The FCPC is housed in an upper case 20 with a top panel 21 and a support substrate in its lower side to have fixed thereon components that will be described later.

The lower case 10 has a flange 12 on its upper rim and the upper case 20 has a flange 22 on its lower rim. The two cases are integrally assembled such that the two flanges are fastened together with a screw 13 or the like so as to face each other. In this specification, a case in which the two cases are integrally assembled in this manner is referred to as a single case 30.

The fuel cell stack ST housed in the lower case 10 is electrically connected to the FCPC housed in the upper case 20 through wiring inside or outside the case 30. As will be described later, the upper case 20 has formed therein an introduction port 23 for introducing refrigerant thereinto and a discharge port 24 for discharging the refrigerant therefrom.

The FCPC housed in the upper case 20 will be described with reference to FIG. 3. The FCPC includes a reactor 40, which is a component that forms the boost converter; an electric power converter IPM including a semiconductor 41, diode 42, and capacitor 43; and further a relay circuit 50. The switching element for the boost converter is provided in the electric power converter IPM. The relay circuit 50 includes two relays that are an FRB and an FRG. This type of relay circuit is conventionally known.

In this example, the relay circuit 50 is configured to also include a precharge circuit 51. The precharge circuit 51 has a relay FRP and a limiting resistor R1 connected in parallel to the relay FRG. Further, the precharge circuit 51 is connected to the relay circuit 50 via bus bars 52 for precharge, and the electric power converter IPM and the relay circuit 50 are connected to each other via service plugs S/P that are components for securing the cut-off of a high-voltage circuit in servicing.

Figure 3:
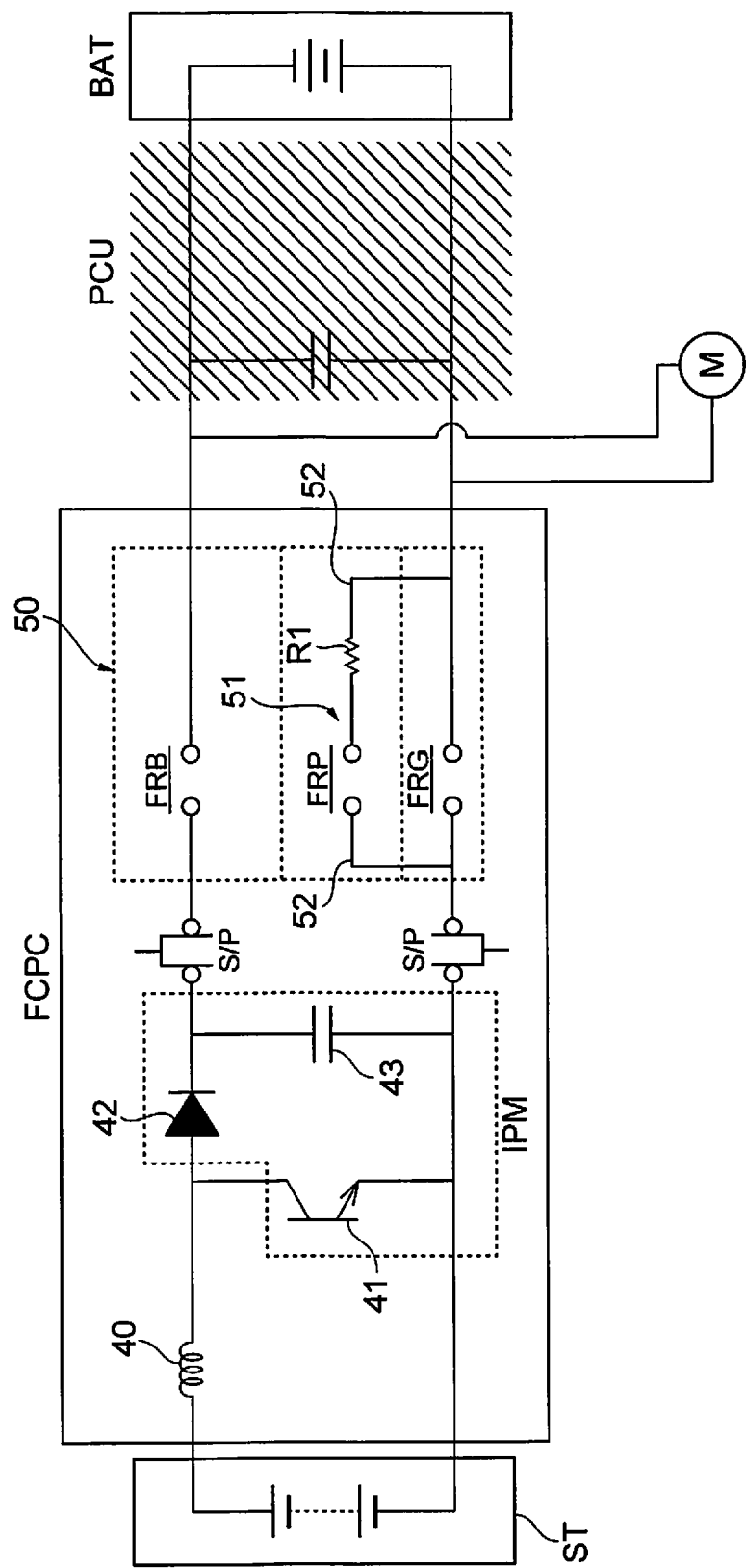

In FIG. 3, the ST is the fuel cell stack housed in the lower case 10, and is electrically connected to the FCPC housed in the upper case 20. The voltage of the fuel cell stack ST is boosted by the operation of the reactor 40 that forms the boost converter and the switching element in the electric power converter IPM. The boosted DC voltage is supplied to a load (for example, a drive motor of the vehicle VE) M through an output terminal of the relay circuit 50.

The output terminal of the relay circuit 50 is connected to the power control unit PCU in parallel with the load (drive motor) M and to a secondary battery BAT via the power control unit PCU. The power control unit PCU is a device for controlling the electric power to be supplied to the motor and an air compressor of the vehicle VE. Further, the precharge circuit 51 is adapted to prevent a large amount of current from flowing through the relays FRB and FRG at turn-on, such that the relay FRP is closed before the relay FRG is closed and the relay FRG is closed after the capacitor 43 in the electric power converter IPM is charged.

In the FCPC with such a circuit configuration, the reactor 40 that forms the boost converter and the switching element in the electric power converter IPM generate a large amount of heat during operation. As shown in FIG. 2, in the fuel cell unit FCU in which the fuel cell stack ST and FCPC are housed in the single case 30, the components of the boost converter are directly affected by the heat generation of the fuel cell stack ST. Further, the reactor 40 and the switching element will become under an extremely high temperature environment due to the heat from the fuel cell stack ST as well as their self-generated heat. Therefore, the switching element, in particular, suffers damage from the heat and its operation may become unstable. In addition, when the reactor 40 and the switching element are exposed to such a high temperature environment for a long period of time, the operations of the relays of the relay circuit 50 for switching on and off the electric power output from the fuel cell stack ST may also become unstable. In the fuel cell unit FCU of the embodiment shown in the drawing, such an unstable state can be effectively prevented from occurring.

Figure 4:
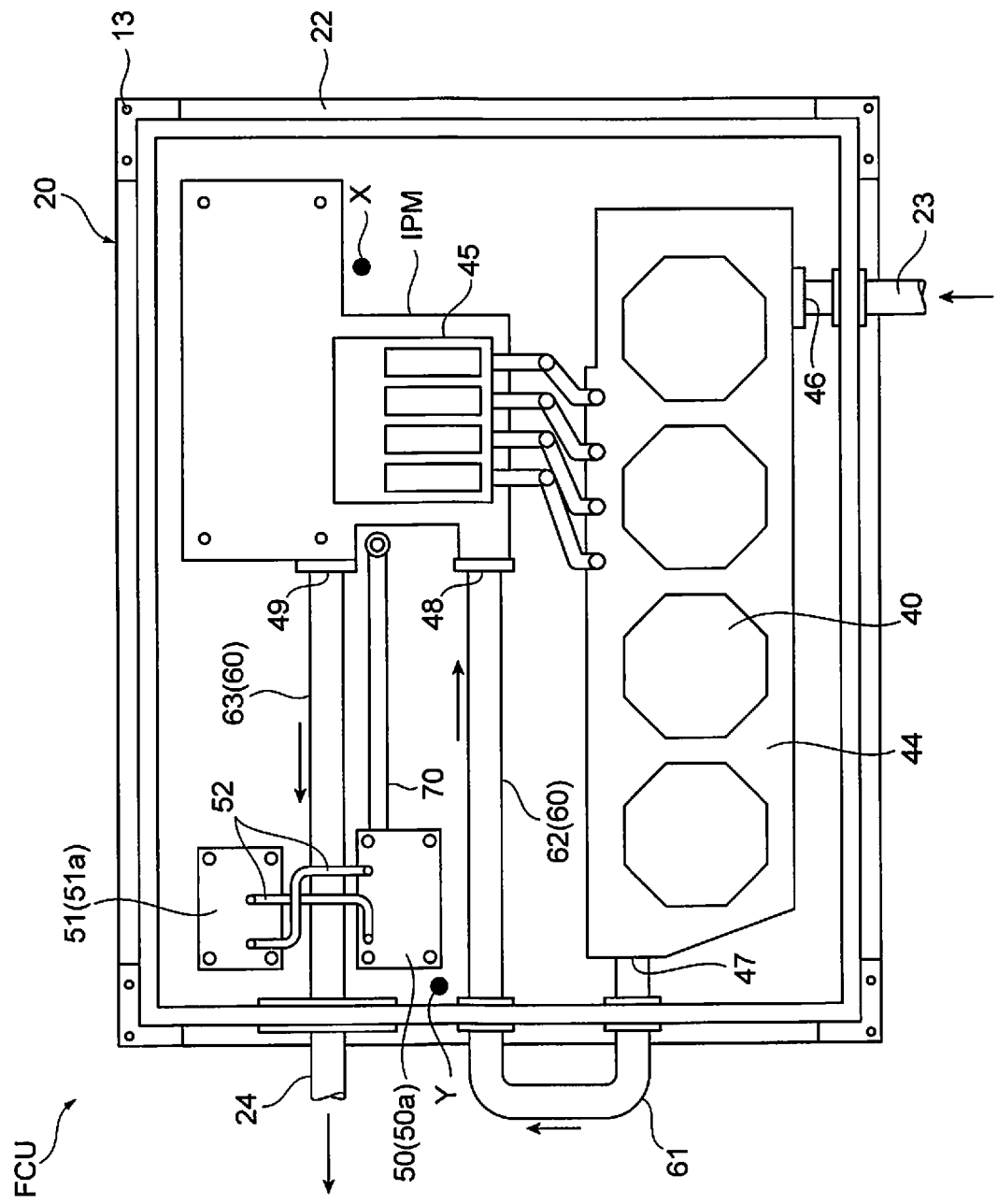
FIG. 4 is a schematic view of the fuel cell unit as viewed from above.

FIG. 4 shows the fuel cell unit FCU whose side surface is shown in FIG. 2, as viewed from above, illustrating the arrangement of the main components of the FCPC, as viewed from above, which is housed in the upper case 20 and whose circuit configuration is shown in FIG. 3. It should be noted that for easy understanding of the drawing, the top panel 21 of the upper case 20 is not shown in the drawing. Further, electrical wiring for the components other than the bus bars that will be described later is not shown.

In the present embodiment, the reactor 40 that forms the boost converter and electric power converter IPM each have a cooling component provided with a channel for refrigerant. In FIG. 4, reference numerals 44 and 45 denote the cooling component provided to the reactor 40 and the cooling component provided to the electric power converter IPM, respectively. The reactor 40 is integrally formed with the cooling component 44 disposed therebelow, and with refrigerant flowing through the channel for refrigerant formed in the cooling component 44, the reactor 40 is cooled, so that the heat generation is suppressed. Similarly, the electric power converter IPM is integrally formed with the cooling component 45 disposed therebelow, and with refrigerant flowing through the channel for refrigerant formed in the cooling component 45, the electric power converter IPM is cooled, so that the heat generation of the switching element in the electric power converter IPM is suppressed.

The refrigerant introduction port 23 (see also FIG. 2) penetrating the surrounding wall of the upper case 20 is connected to the cooling component 44 of the reactor 40 and the refrigerant introduced through the refrigerant introduction port 23 flows into the channel for refrigerant through a flow-in port 46 formed in the cooling component 44. The refrigerant that has flowed in circulates within the channel for refrigerant, and then flows out of the cooling component 44 through a flow-out port 47 formed in the cooling component 44. The refrigerant that has flowed out flows through a pipe 61 positioned outside the surrounding wall of the upper case 20 and flows into the first cooling pipe 62 disposed inside the upper case 20. It should be noted that the pipe 61 may be positioned inside the upper case 20, in which case, the pipe 61 is part of the first cooling pipe 62.

The first cooling pipe 62 is connected to a flow-in port 48 formed in the cooling component 45 disposed below the electric power converter IPM, and the refrigerant flows into the channel for refrigerant of the cooling component 45 from the first cooling pipe 62. The refrigerant that has flowed in circulates within the channel for refrigerant, and then flows out of the cooling component 45 through a flow-out port 49 formed in the cooling component 45. With the refrigerant circulating within the channel for refrigerant of the cooling component 45 disposed below the electric power converter IPM, the electric power converter IPM and the switching element in the electric power converter IPM are cooled, so that the heat generation of the switching element is suppressed. Thus, an excessive increase in the temperature of the switching element is prevented.

The refrigerant, which has cooled the switching element through circulating within the channel for refrigerant of the cooling component 45 disposed below the electric power converter IPM, flows out to a second cooling pipe 63 through the flow-out port 49 formed in the cooling component 45. One of the ends of the second cooling pipe 63 is connected to the discharge port 24 (see also FIG. 2) formed in the surrounding wall of the upper case 20, and the refrigerant is discharged to the outside through the discharge port 24. It should be noted that in this specification, the first cooling pipe 62 and the second cooling pipe 63 are collectively referred to as a cooling pipe 60.

As shown in FIG. 4, in this example, the first cooling pipe 62 and the second cooling pipe 63 are disposed substantially in parallel with each other with a predetermined distance therebetween. Further, a relay circuit component 50a as a component of the FCPC is disposed in a position closer to the second cooling pipe 63 than to the first cooling pipe 62 in a region therebetween, and near the discharge port 24 formed in the surrounding wall of the upper case 20. Furthermore, the aforementioned electric power converter IPM is disposed in a position closer to a surrounding wall on the side opposite to the surrounding wall in which the discharge port 24 is positioned in the upper case 20. In other words, the relay circuit component 50a is positioned closer to the second cooling pipe 63 than to the electric power converter IPM (the switching element thereof) inside the upper case 20. In addition, a precharge circuit component 51a as a component of the relay circuit component 50a is positioned so as to face the relay circuit 50 with the second cooling pipe 63 disposed therebetween.

The relay circuit component 50a and the electric power converter IPM are connected to each other via a bus bar 70 as part of electrical wiring, and the bus bar 70 is disposed along the second cooling pipe 63 as shown in the drawing. Further, the bus bars 52 for precharge that electrically connect the precharge circuit component 51a and the relay circuit component 50a are disposed such that they cross over the second cooling pipe 63 with a portion thereof extending along the second cooling pipe 63.

In the example shown in the drawing, either the bus bar 70 or any one of the bus bars 52, or all are designed, in circuit designing, to have a cross-sectional area exceeding the cross-sectional area that can tolerate the maximum current flowing during operation of the FCPC.

As described above, in the aforementioned fuel cell unit FCU, the fuel cell stack ST, the components of the boost converter (the reactor 40 and the switching element in the electric power converter IPM, and the like), the relay circuit component 50a, and the like are housed in the single case 30 that includes the lower case 10 and the upper case 20. Therefore, the components of the FCPC are likely to have an excessively increased temperature during operation due to the self-generated heat as well as the heat from the fuel cell stack ST. To avoid this, in this example, as described above, the reactor 40 and the electric power converter IPM are provided with the cooling components 44 and 45, respectively, and refrigerant is allowed to flow through the cooling components 44 and 45 via the cooling pipes, so that the heat generation of the reactor 40 and the switching element in the electric power converter IPM is suppressed.

Meanwhile, for stable operation of the fuel cell unit FCU, it is necessary to prevent the temperature of the relay (the relay circuit 50 and precharge circuit 51) for switching on and off the electric power output from the fuel cell stack ST from excessively increasing. To this end, in the fuel cell unit FCU shown in FIG. 4, the relay (the relay circuit component 50*a* and precharge circuit component 51*a*) is disposed in a position closer to the first cooling pipe 62 and second cooling pipe 63 than to the electric power converter IPM that includes the switching element. Thus, excessive heating of the relay with the heat from the switching element that is a source of heat generation is suppressed and the relay is deprived of heat by the cooled heat of the refrigerant flowing through the cooling pipe 60 (the first cooling pipe 62 and second cooling pipe 63) as well, so that an increase in the temperature of the relay is suppressed.

Further, in the example shown in FIG. 4, with the relay circuit component 50*a* disposed in a region between the first cooling pipe 62 and the second cooling pipe 63, the relay circuit component 50*a* can be cooled by the refrigerant in both the cooling pipes 62 and 63, so that the efficiency of cooling the relay circuit component 50*a* is further improved.

Further, as described above, the relay circuit component 50*a* is disposed in a position closer to the second cooling pipe 63 than to the first cooling pipe 62 in a region therebetween. Therefore, the refrigerant flowing through the cooling pipe 60 loses its cooled heat due to the cooling of the relay less in the first cooling pipe 62 than in the second cooling pipe 63. Thus, the refrigerant flowing through the first cooling pipe 62 can reach the cooling component 45 of the electric power converter IPM without a substantial loss of the cooled heat. Accordingly, the primary function of cooling the switching element of the refrigerant flowing through the first cooling pipe 62 can be almost surely prevented from being lost due to the cooling of the relay.

In addition, in the example shown in FIG. 4, since the bus bar 70 and bus bars 52 that electrically connect the relay circuit component 50*a* to the other components are entirely or partly disposed along the cooling pipe (the second cooling pipe 63 in this example), an increase in the temperature of the bus bars is suppressed by the refrigerant flowing through the second cooling pipe 63. This can also further effectively suppress an increase in the temperature of the relay.

Further, in the example shown in FIG. 4, either the bus bar 70 or any one of the bus bars 52, or all are designed, in circuit designing, to have a cross-sectional area exceeding a cross-sectional area that can tolerate the maximum current flowing during operation of the FCPC. In this manner, the cross-sectional area of the bus bar(s) is set larger than that originally required, so that the heat radiation performance of the bus bar(s) can be enhanced. This can also suppress an increase in the temperature of the relay.

As described above, in the fuel cell unit FCU of the aforementioned embodiment, even in the fuel cell unit in which the fuel cell stack, boost converter for boosting the electric power output from the fuel cell stack, relay for switching on and off the electric power output from the fuel cell stack, and the like are housed in one case, an excessive increase in the ambient temperature inside the case can be suppressed, and damage caused by excessive heat generation of the relay can also be surely avoided. This enables the fuel cell unit to stably operate and have a long life.

It should be noted that in the example of the fuel cell unit FCU designed by the inventors, during operation, when the temperature at the point X near the electric power converter IPM indicated in FIG. 4 was 96.7° C., the temperature at the point Y near the relay circuit component 50*a* was 89.1° C. The temperature of 89.1° C. is in the range of the temperature that allows the relay normally used in the fuel cell unit FCU to operate without suffering thermal damage.

DESCRIPTION OF SYMBOLS

FCU Fuel cell unit
VE Vehicle
M Drive motor
EC Engine compartment
ST Fuel cell stack
FCPC Fuel cell power control unit
IPM Electric power converter
PCU Power control unit
BAT Secondary battery
10 Lower case
20 Upper case
23 Introduction port for introducing refrigerant into upper case
24 Discharge port for discharging refrigerant from upper case
30 Case in which lower case and upper case are integrally formed
40 Reactor
41 Semiconductor
42 Diode
43 Capacitor
44 Cooling component provided to reactor
45 Cooling component provided to electric power converter
46 Flow-in port formed in cooling component provided to reactor
47 Flow-out port formed in cooling component provided to reactor
48 Flow-in port formed in cooling component provided to electric power converter
49 Flow-out port formed in cooling component provided to electric power converter
50 Relay circuit
50*a* Relay circuit component
51 Precharge circuit
51*a* Precharge circuit component
52 Bus bar for precharge
60 Cooling pipe
61 Pipe positioned outside surrounding wall of upper case
62 First cooling pipe
63 Second cooling pipe
70 Bus bar that connects relay circuit and electric power converter

What is claimed is:
1. A fuel cell unit comprising:
   a fuel cell stack;
   a boost converter including at least a switching element and a reactor adapted to boost electric power output from the fuel cell stack;
   a reactor cooling component including a channel for refrigerant for cooling the reactor;
   a switching element cooling component including a channel for refrigerant for cooling the switching element;
   a cooling pipe including a first cooling pipe through which refrigerant flowing out of the reactor cooling component and into the channel for refrigerant of the switching element cooling component flows, and a second cooling pipe through which the refrigerant flowing out of the channel for refrigerant flows; and
   a relay adapted to switch on and off the electric power output from the fuel cell stack, and
   a precharge circuit;

wherein the fuel cell stack, the boost converter, the cooling pipe, and the relay are housed in one case, and the relay is disposed in a position closer to the cooling pipe than to the switching element;

wherein the relay is disposed in a position between the first cooling pipe and the second cooling pipe; and wherein the cooling pipe is arranged such that coolant flows first through the reactor cooling component, then through the switching element, and then between the relay circuit and the precharge circuit.

2. The fuel cell unit according to claim 1, wherein the relay is disposed in a position closer to the second cooling pipe than to the first cooling pipe.

3. The fuel cell unit according to claim 1, further comprising one or more bus bars adapted to electrically connect the relay to another component in the case, the one or more bus bars being at least partially disposed along the cooling pipe.

4. The fuel cell unit according to claim 3, wherein the one or more bus bars have a cross-sectional area exceeding a cross-sectional area capable of tolerating a maximum current flowing through the one or more bus bars.

\* \* \* \* \*